United States Patent Office 3,639,360
Patented Feb. 1, 1972

3,639,360
METHOD OF PREPARING COLORED POLYAMIDES
Zbynek Bukac and Jan Sebenda, Prague, Czechoslovakia, assignors to Ceskoslovenska Akademie Ved, Prague, Czechoslovakia
No Drawing. Continuation-in-part of application Ser. No. 804,320, Mar. 4, 1969. This application Sept. 3, 1969, Ser. No. 855,040
Claims priority, application Czechoslovakia, Mar. 4, 1968, 1,702/68
Int. Cl. C08g 20/12, 51/66
U.S. Cl. 260—78 L                    3 Claims

ABSTRACT OF THE DISCLOSURE

Colored polyamides are formed rapidly by polymerization of lactams having rings with 7 to 9 members in the presence of alkali and of an azo dye of the formula R—R' wherein R is

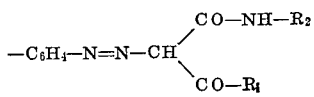

R' is R, hydrogen, lower alkyl, phenyl, di-lower-alkyl-amine, lower alkoxy, or lower acylamine;
$R_1$ is alkyl $C_{1-17}$ or phenyl; and
$R_2$ is aryl, alkyl $C_{1-18}$, or alkoxy-phenyl.

REFERENCE TO RELATED APPLICATION

This application is a continuation-in-part of our copending application Ser. No. 804,320, filed Mar. 4, 1969, and now abandoned.

BACKGROUND OF THE INVENTION

This invention relates to the polymerization of ε-caprolactam and similar cyclic amides having rings with seven to nine members.

It is known that the polymerization of caprolactam and of its higher homologs can be initiated or catalyzed by strong bases, such as the alkali metal salts of the lactams, and that the polymerization proceeds rapidly at about 250° C. The salts lose their catalytic efficiency at temperatures below 220° C. It is also known to produce colored polyamides by adding certain organic dyes to a polymerization mixture containing extremely potent catalysts which raise the viscosity of the polymerization mixture so quickly as to make it difficult to handle.

SUMMARY OF THE INVENTION

It has now been found that azo dyes of the formula R—R' wherein

R is

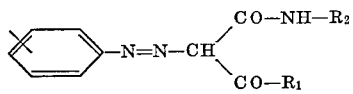

R' is R, hydrogen lower alkyl, phenyl, di-lower-alkyl-amine, lower alkoxy, or lower acylamine;
$R_1$ is alkyl $C_{1-17}$ or phenyl; and
$R_2$ is aryl, alkyl $C_{1-18}$, or alkoxy-phenyl permit the polymerization of lactams having rings with 7 to 9 members in the presence of alkali metal salts of such lactams to proceed rapidly at temperatures of 170° to 210° C., and colored polymers are formed directly. Colored activators as used according to this invention were prepared by joining diazotized aromatic amines with β-ketoamides by methods described in the literature (S. H. Parmerter, Organic Reactions 10, 1 (1959), J. Wiley & Sons, New York).

The polymerization mixtures are stable at normal room temperatures (15°–25° C.) which are well below their melting points, and may be stored for practically unlimited periods in hermetically sealed containers. We have successfully stored such mixtures initially prepared in the form of powders, pellets, or solidified melts and polymerized them much later. This property of the polymerization mixtures of this invention permits a particularly economical utilization of polymerization equipment, and is convenient particularly with mixtures in which caprylolactam, which polymerizes easily, is the sole or predominant monomer.

The colors of the catalysts of the invention range from yellow to red. The polymers of this invention thus may be colored in any desired shade within this range by using the catalysts singly or in mixtures, and additional colors are available when dyes inert to the polymerization reaction and having colors outside the yellow and red spectrum are added to the polymerization mixture.

The polymerization of lactams in the presence of alkali metal salts of the same or homologous lactams is known in itself, and the normal procedures customary in this art are employed in the method of this invention.

The method is further illustrated by the following examples, but it will be understood that the invention is not limited thereto.

Example 1

A polymerization mixture was prepared from ε-caprolactam, 0.5 mole percent sodium caprolactam, and 0.25 mole percent α-(p-diethylaminobenzeneazo)-acetoacetanilide (I), a compound according to the above formula in which R' is p-diethylamine, $R_1$ is $CH_3$, and $R_2$ is phenyl.

The mixture was heated for 60 minutes to 180° C. in a stream of dry nitrogen which provided an inert atmosphere. The polymerization mixture was orange and contained 96.2% polymer.

Equilibrium between monomer and polymer was achieved with a heating cycle of 10 minutes at 215° C. followed by 50 minutes at 175° C. The same result was achieved by heating 120 minutes to 100° C. and 60 minutes to 180° C. When ε-enantholactam and its sodium salt were kept in contact with the same catalyst for 180° C. for one hour almost complete equilibrium between monomer and polymer was achieved.

Example 2

A mixture of 0.1 mole ε-caprolactam and 0.0006 mole sodium caprolactam was brought to 100° C. and 0.0002 mole of the azo dye α-benzeneazoacetanilide (R' is hydrogen, $R_1$ is methyl, $R_2$ is phenyl) (II) was dissolved in the melt which was held thereafter at 180° C. for 60 minutes under a nitrogen blanket. Equilibrium between polymer and monomer was thereby established in the polymerization mixture.

Example 3

One mole of ε-caprolactam was melted at 100° C. and 0.005 mole sodium caprolactam and 0.0033 mole 2-(4'-diethylaminobenzeazo)-3-oxopentanoic acid p - anisidide (R' is $Et_2N$—, $R_1$ is ethyl, $R_3$ is methoxyphenyl) (III) were sequentially added. The mixture was heated for 60 minutes. 94 to 97% polyamide were found in the polymerization mixture in repeated runs performed under closely similar conditions.

Example 4

A polymerization mixture was prepared as in Example 3 from ε-caprolactam and sodium caprolactam, and 0.003 mole N-n-dodecyl-2-(4'-diethylaminobenzeneazo)-3-oxo-pentanoylamide (R' is Et$_2$N—, R$_1$ is ethyl, R$_2$ is n-C$_{12}$H$_{25}$) (IV) was added as a polymerization initiator or catalyst. After having been held for 60 minutes at 175° C., the mixture was found to contain 95–97% polymer.

Example 5

A homogeneous melt of 0.3 mole γ-methyl-ε-caprolactam and 0.7 mole ε-caprolactam was sequentially mixed with 0.0005 mole caprolactam and 0.00017 mole bis-[2-(phenyl-4-azo)-2-acetylacetic acid p-anisidide] (R' is R, R$_1$ is methyl, R$_2$ is methoxyphenyl) (V). The mixture was heated to 200° C. and kept at that temperature for 75 minutes, whereupon it was found to contain the expected copolymer and the monomers in equilibrium amounts.

Example 6

A polymerization mixture as described in Example 1 was prepared and pelletized under an inert nitrogen atmosphere (1). The pellets were stored sixty days at 25° C. in sealed containers in which all oxygen had been displaced by nitrogen. They were then removed from the container, fused at 100° C., the air present in the fusion vessel was replaced by nitrogen, and the melt was heated to 175° C. The polymerization mixture thereafter contained 96.5% of the desired polyamide.

Example 7

ε-Caprylolactam was mixed in the molten state with 0.4 mole percent sodium caprylolactam and 0.2 mole percent α-(p-diethylaminobenzeneazo)-acetoacetanilide (I). When heated to 170° C. for 60 minutes, the polymerization mixture reached equilibrium between monomer and polyamide.

Example 8

In a melt of ε-caprolactam and 0.4 mole percent sodium caprolactam 0.2 mole percent α-(3,4-dimethylbenzeneazo)-acetoacetanilide (VII) was dissolved. The resulting solution was heated for 60 minutes to 185° C. The polymer contained an equilibrium amount of polyamide.

Example 9

To the solution of 0.50 mole percent of sodium caprolactam in caprolactam 0.3 mole percent p-toluidide of α-(4-methylbenzeneazo)-acetoacetic acid (VI) was added and homogenized at 100° C. By heating for 5 minutes at 280° C. and 60 minutes at 170° C. a polymer was formed with an equilibrium amount of monomer of α-polyamide.

Example 10

By dissolving 0.1 mole percent of α-(4-acetoamidobenzeneazo)-acetoacetanilide (IX) and 0.2 mole percent of α-(4-methoxybenzeneazo)-acetoacetanilide (VIII) in a melt of caprolactam containing 0.7 mole percent sodium caprolactam a polymerization mixture was obtained that polymerized to an equilibrium after heating for 60 minutes to 170° C.

Example 11

A colored polyamide with an equilibrium amount of monomer was prepared by heating of a polymerization mixture containing 0.5 mole percent of sodium caprolactam in caprolactam, 0.125 mole percent methylamide of α-stearoyl-α-(1-naphthylazo)-acetic acid (X), and 0.125 mole percent octadecylamide of α-(p-diethylaminobenzeneazo)-acetoacetanilide acid (XI) for 50 minutes at 190° C.

Example 12

In a mixture of 0.8 mole of caprolactam and 0.2 mole of caprylolactam 0.005 mole sodium caprolactam and 0.0025 mole α-(1-naphthylazo)-acetoacetanilide (XII) were dissolved at 100° C. After tempering at 180° C. for 60 minutes a copolyamide in an equilibrium amount was obtained.

Example 13

In γ-methyl-caprolactam 0.4 mole percent sodium-ε-caprolactam and 0.2 mole percent α-benzoyl-α-(p-diethylaminobenzeneazo)-N-benzylacetoamide (XIII) were dissolved at 100° C. and heated for 2 hours at 180° C. A polyamide with an equilibrium amount of γ-methyl-caprolactam was formed.

Example 14

A polymerization mixture was prepared, using the same proportion of catalyst and activator as in Example 1. As colored activator the same amount of α-benzoyl-α-(p-diethylaminobenzeneazo)-acetanilide (XIV) was used. By tempering of this mixture for 5 minutes at 210°–220° C. and for 50 minutes at 175° C. a polymerizate resulted with an equilibrium amount of polycaprolactam.

R', R$_1$ and R$_2$ of the azo dies, referred to in the preceding examples, of the formula R—R', and of the following portion of R

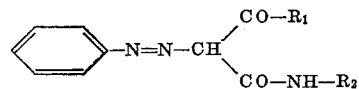

are shown in the following table.

| Formula | Example | R$_1$ | R$_2$ | R' |
|---|---|---|---|---|
| I | 1, 6, 7 | CH$_3$— |  | p-(C$_2$H$_5$)$_2$N— |
| II | 2 | CH$_3$— |  | H |
| III | 3 | C$_2$H$_5$— |  | p-(C$_2$H$_5$)$_2$N— |
| IV | 4 | C$_2$H$_5$— | C$_{12}$H$_{25}$— | p-(C$_2$H$_5$)$_2$N— |
| V | 5 | CH$_3$— |  | 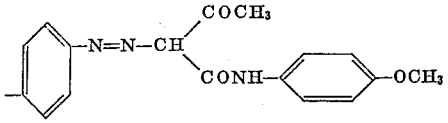 |
| VI | 9 | CH$_3$— |  |  |

| Formula | Example | R₁ | R₂ | R' |
|---|---|---|---|---|
| VII | 8 | $CH_3-$ | phenyl | 3,4-dimethyl |
| VIII | 10 | $CH_3-$ | phenyl | $4-CH_3O-$ |
| IX | 10 | $CH_3-$ | phenyl | $4-CH_3 \cdot CO \cdot NH-$ |
| X | 11 | $C_{17}H_{35}-$ | $CH_3$ | 2,3-benzo- |
| XI | 11 | $CH_3-$ | $C_{18}H_{37}-$ | $p-(C_2H_5)_2N-$ |
| XII | 12 | $CH_3-$ | naphthyl | H |
| XIII | 13 | phenyl | $-C_6H_4-CH_2-$ | $p-(C_2H_5)_2N-$ |
| XIV | 14 | phenyl | biphenyl | $p-(C_2H_5)_2N-$ |

We claim:

1. In a method of polymerizing a lactam having seven to nine members in its lactam ring in a polymerization mixture containing an alkali metal salt of said lactam, the improvement which consists in accelerating said polymerization by adding to said mixture an effective amount of a compound of the formula R—R', wherein R is

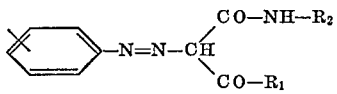

or

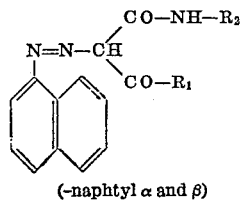

(-naphtyl α and β)

R' is R, hydrogen, lower alkyl, phenyl, di-lower-alkylamine, lower alkoxy, or lower acylamine;

$R_1$ is alkyl $C_{1-17}$ or phenyl; and
$R_2$ is aryl, alkyl $C_{1-18}$, or alkoxy-phenyl.

2. In a method as set forth in claim 1, said lactam being polymerized by holding said mixture at a temperature between 170° and 210° C.

3. In a method as set forth in claim 2, said mixture being prepared at a temperature substantially below 170° C. and stored thereafter at a temperature below the melting point thereof prior to said polymerizing.

References Cited

UNITED STATES PATENTS 3,448,085  6/1969  Pietrusza et al. _____ 260—78

FOREIGN PATENTS 1,026,278  3/1958  Germany _____ 260—37

MORRIS LIEBMAN, Primary Examiner
P. R. MICHL, Assistant Examiner

U.S. Cl. X.R.

8—4, 41 B; 260—37 N, 193